United States Patent
Quiroz

(10) Patent No.: US 7,338,101 B2
(45) Date of Patent: Mar. 4, 2008

(54) APPARATUS AND METHOD FOR HANDLING A CROSSOVER TUBE OF A GAS TURBINE

(76) Inventor: Mario I. Quiroz, 2301 W. Nebraska St., Tucson, AZ (US) 85746

( * ) Notice: Subject to any disclaimer, the term of this patent is extended or adjusted under 35 U.S.C. 154(b) by 80 days.

(21) Appl. No.: 11/067,863

(22) Filed: Feb. 28, 2005

(65) Prior Publication Data

US 2006/0192399 A1    Aug. 31, 2006

(51) Int. Cl.
  *B25B 27/14* (2006.01)
(52) U.S. Cl. .................. 294/19.1; 29/270
(58) Field of Classification Search ........... 294/19.1, 294/24; 29/889.1, 889, 225, 270, 272, 278; 81/418, 487
  See application file for complete search history.

(56) References Cited

U.S. PATENT DOCUMENTS

| | | | |
|---|---|---|---|
| 4,553,305 A * | 11/1985 | Dearman | 29/272 |
| 4,936,500 A | 6/1990 | McClure | |
| 5,228,181 A * | 7/1993 | Ingle | 29/272 |
| 5,481,793 A | 1/1996 | McClure | |
| 6,443,515 B1 * | 9/2002 | Wu | 294/16 |
| 6,477,773 B1 * | 11/2002 | Wilson et al. | 29/889.1 |

OTHER PUBLICATIONS

"Fundamentals of Aircraft Gas Turbine Engines". SweetHaven Publishing Services, 4 pages, updated Jan. 25, 2005.

* cited by examiner

*Primary Examiner*—Dean J Kramer
(74) *Attorney, Agent, or Firm*—Lawrence R. Oremland, P.C.

(57) ABSTRACT

A unique, new and useful structure and method is provided for effectively and efficiently engaging and manipulating a crossover tube of a gas turbine. The tool is manipulated to a gripping position in which it securely engages the spring loaded locks of a crossover tube while applying a reaction force to a portion of the burner basket that is associated with the crossover tube, so that manipulating the handle manipulates the crossover tube that is engaged by the tool. A preferred version of the tool has specially designed structure for coupling a handle with the gripper and follower structure such that the tool can effectively and efficiently reach and manipulate crossover tubes that are in particularly difficult to reach areas of a gas turbine.

6 Claims, 18 Drawing Sheets

TOP VIEW

TOP VIEW

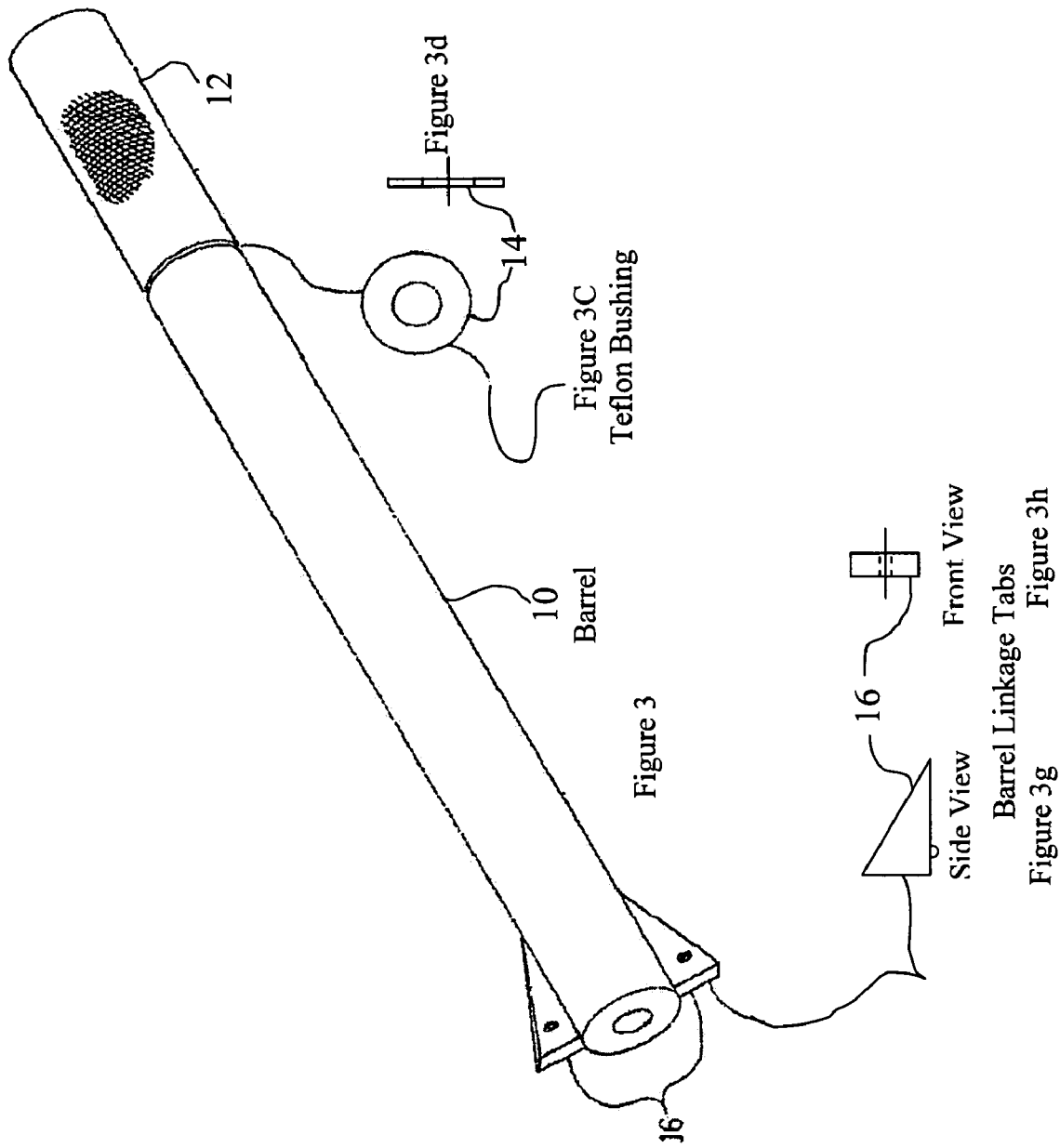

END VIEW

BACK VIEW

SIDE VIEW
BARREL AND LINKAGE TABS

SIDE VIEW

ROTATING SCREW HANDLE

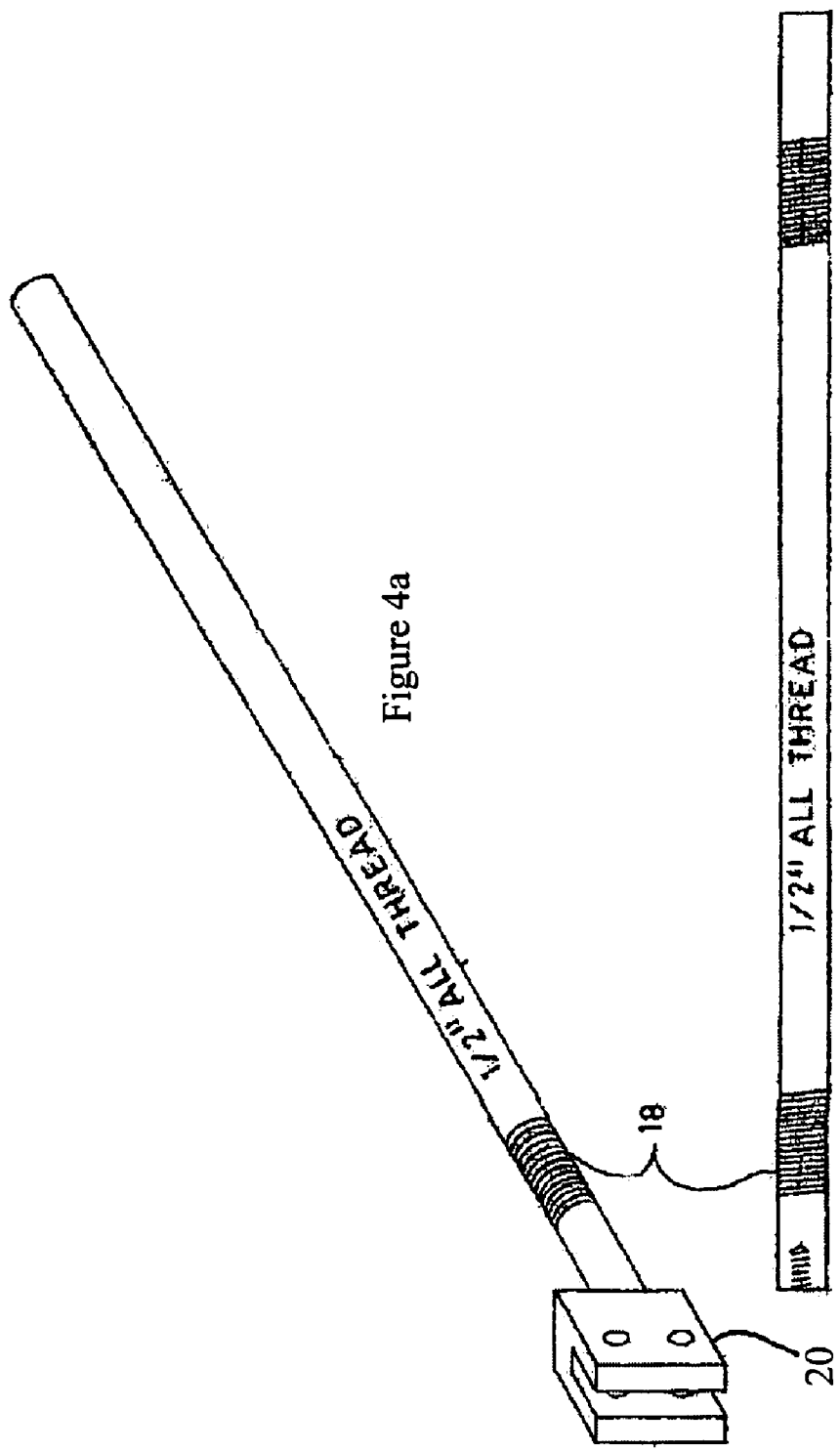

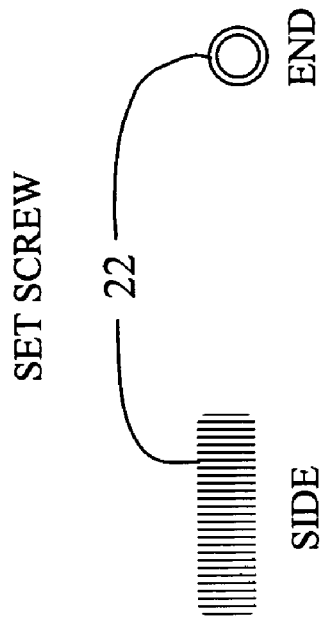
Figure 5f
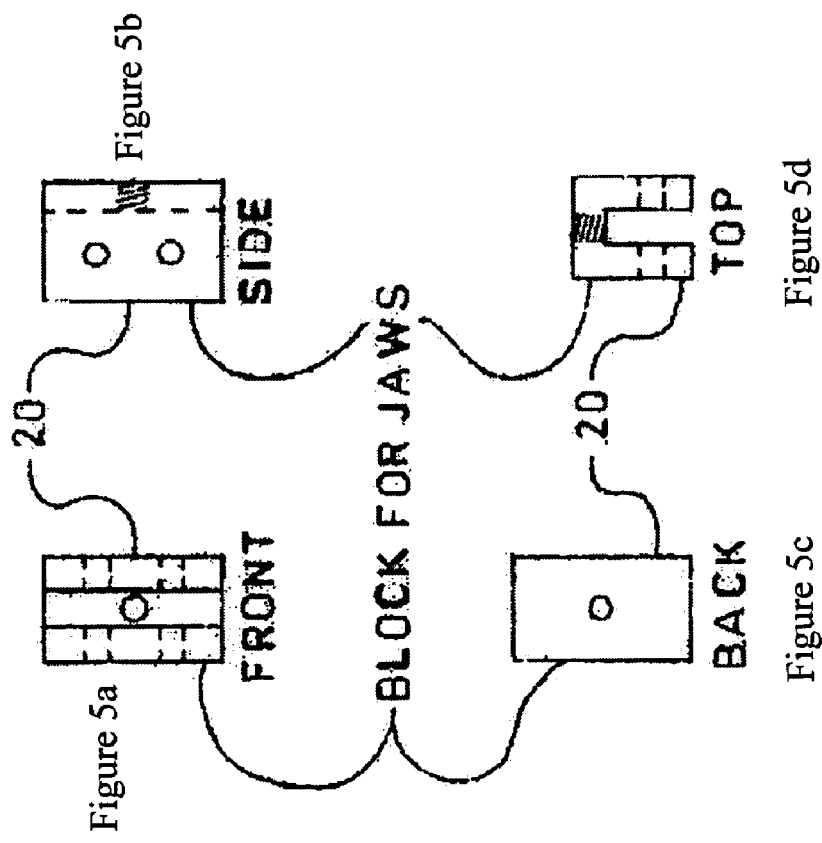

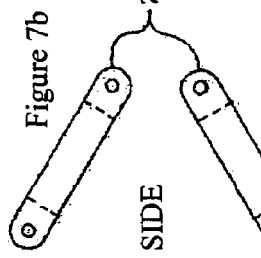
2 - LINKAGE
Figure 7b
Figure 7a TOP
Figure 7c SIDE
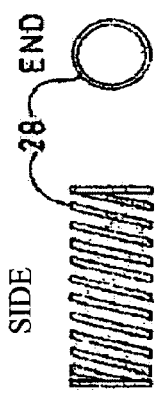
RETURN SPRING
Figure 8a SIDE
Figure 8b END
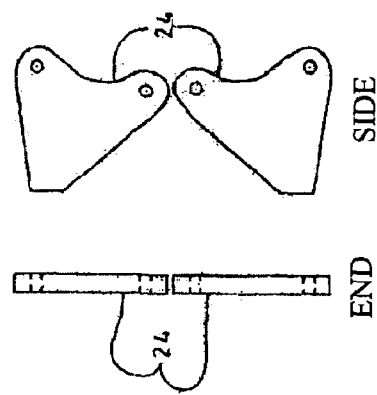
2- AJUSTING JAWS
Figure 6a SIDE
Figure 6b END

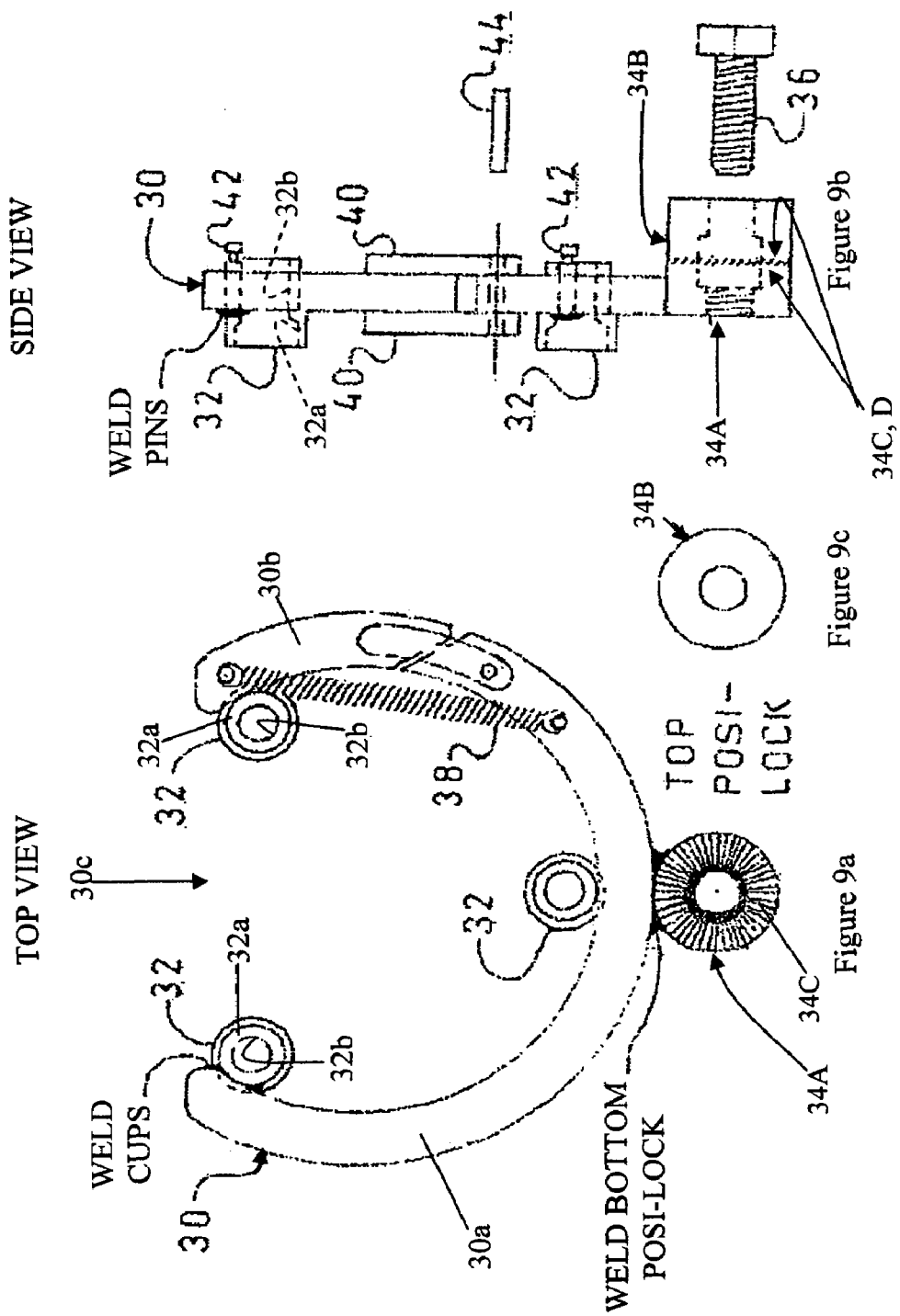

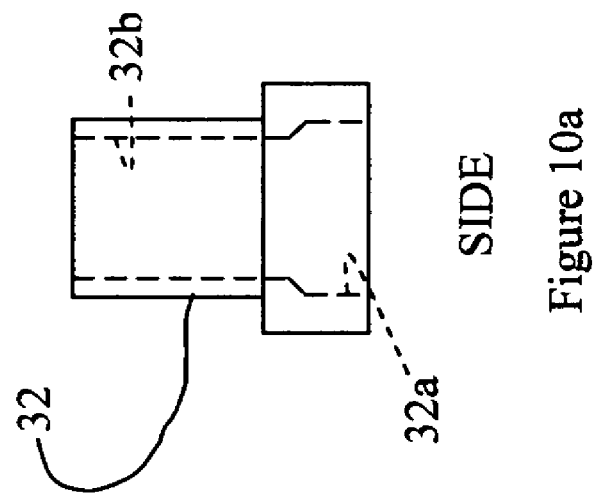
Figure 10a SIDE
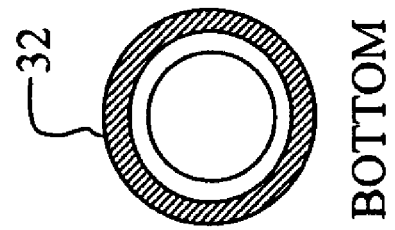
Figure 10c BOTTOM
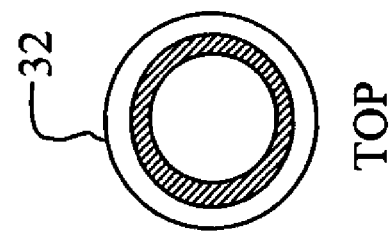
Figure 10b TOP

ONE SET OF POSI-LOCKS ONE THREADED
AND ONE NOT THREADED

TOP

SIDE

3/8" BOLT FOR ONE POSI-LOCK

SIDE

END

ONE SPRING

TOP    END

TWO HINGES

SIDE    TOP

ONE DOWEL PIN FOR HINGES
SIDE
END
Figure 15a
Figure 15b
TWO DOWEL PINS FOR SPRING
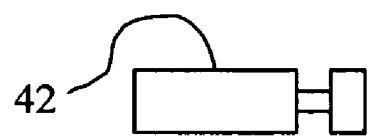
SIDE
END
Figure 16a
Figure 16b

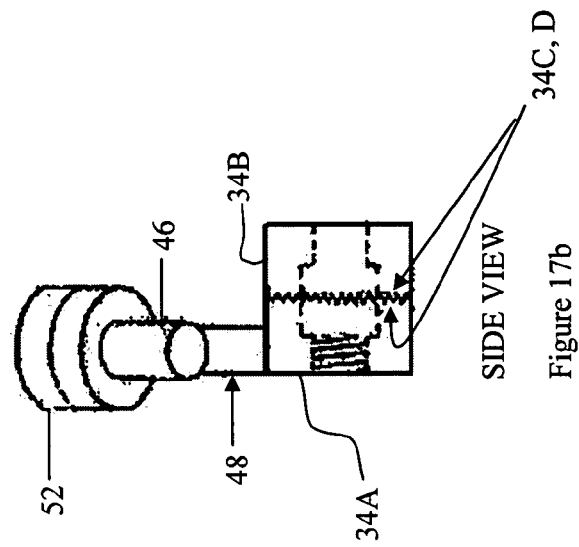
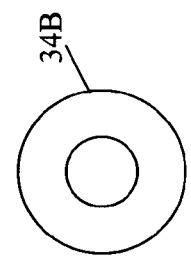
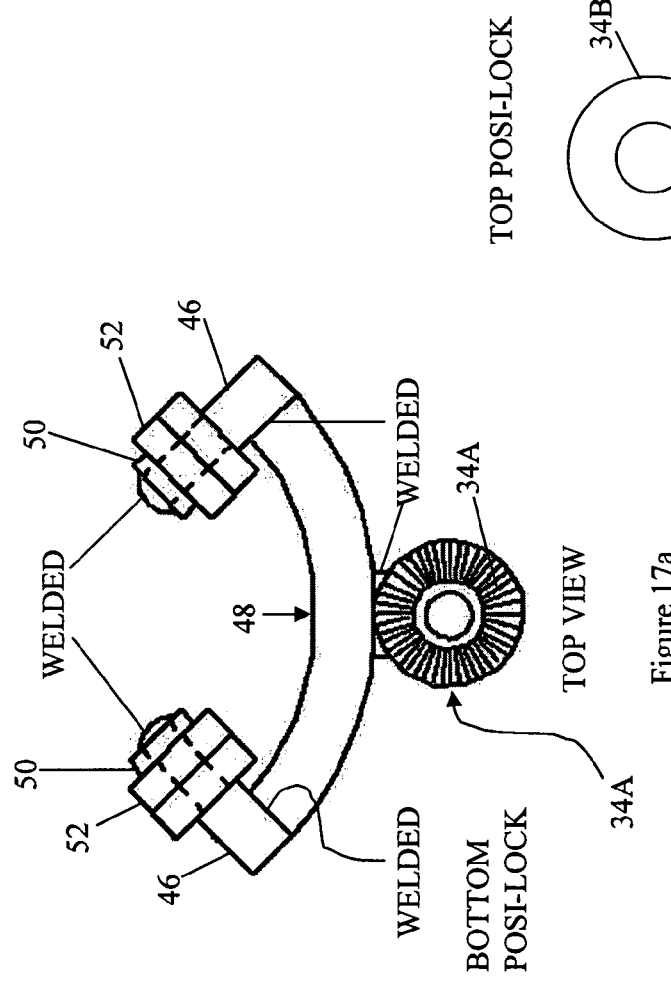

3/8" BOLT FOR OTHER POSI-LOCK

2 – SPINDLES FOR ROLLER PEARINGS
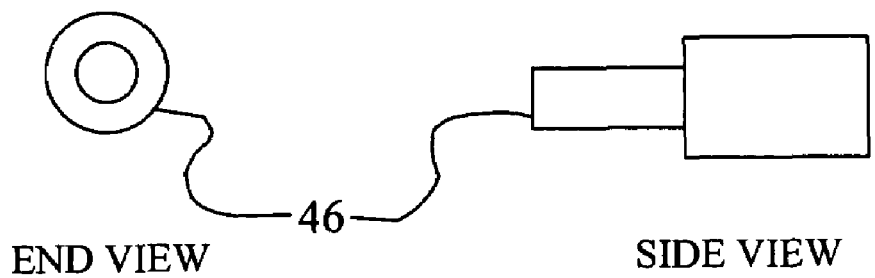
END VIEW
SIDE VIEW
Figure 19b
Figure 19a
1-RING FOR SPINDLES AND POSI-LOCK
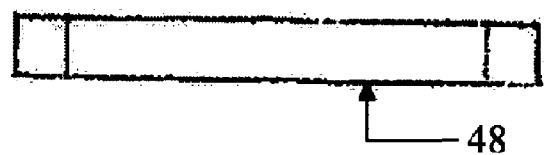
Figure 20B
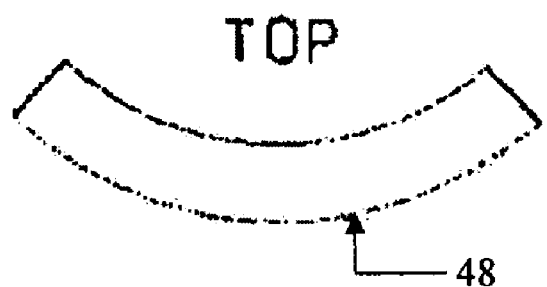
Figure 20A

2 – COLLARS FOR BEARINGS
SIDE          FRONT
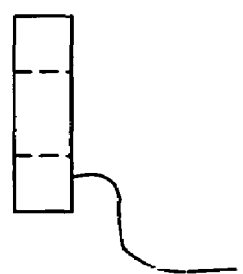 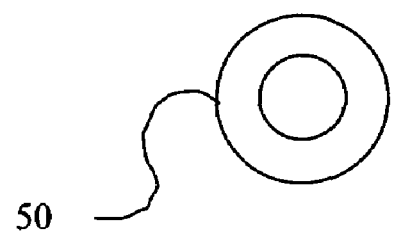
50
Figure 21a          Figure 21b
2 – SETS OF ROLLER BEARINGS
SIDE          FRONT
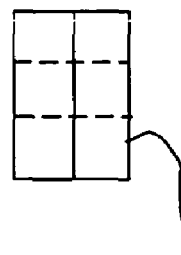 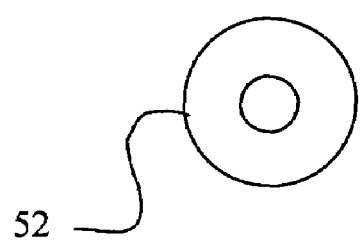
52
Figure 22a          Figure 22b

APPARATUS AND METHOD FOR HANDLING A CROSSOVER TUBE OF A GAS TURBINE

BACKGROUND

The present invention relates to apparatus and method for quickly and efficiently manipulating crossover tubes of a gas turbine. Crossover tubes are also known in this art as "crossflame" tubes.

In a gas turbine, there are a number of crossover tubes that communicate gas between the combustors (also referred to a burner baskets) of the gas turbine. A crossover tube is generally supported on the flange of a burner basket. In a 501 B&D Westinghouse gas turbine, there may be 30 crossover tubes between the burner baskets.

It is necessary to reach into the confines of the gas turbine, to handle the crossover tubes, in order to change the crossover tubes. Such handling requires that an operator reach into the confines of the gas turbine, to release the crossover tubes from their support on the burner baskets, and withdraw the crossover tubes from the turbine. In order to reinsert a new crossover tube, the tube must be manipulated to locate it in an appropriate position on a burner basket, and then lock it to the burner basket.

In the applicant's experience, handling such crossover tubes is a time consuming process that is often subject to "hit and miss" situations, in the sense that the existing tools known to applicant may or may not be capable of effectively engaging a crossover tube. Specifically, existing tools may or may not effectively engage the crossover tube, or may slip off the crossover tube, so that it may take an operator a number of tries to effectively engage a crossover tube, and then manipulate the crossover tube. In applicant's experience, it may take hours to engage and manipulate the 30 tubes of a gas turbine.

Also, there are generally a few crossover tubes that are particularly difficult to effectively reach, engage and manipulate. Specifically, a 501 B & D Westinghouse gas turbine generally has a manhole like cover that is removed in order to provide access to the burner baskets and crossover tubes. When the cover is removed, it is necessary for an operator to reach into the confines of the gas turbine with a tool, in order to remove at least 4 of the crossover tubes. Then, the operator can maneuver himself/herself through the opening and into the confines of the gas turbine, where it is a little easier for an operator to engage a crossover tube with a tool. Thus, the 4 or so crossover tubes that have to be removed by the operator with a tool, before the operator can maneuver into the confines of the gas turbine to remove the other crossover tubes, are particularly challenging.

Applicant believes there is a need for a. tool that can effectively and efficiently engage and manipulate a crossover tube of a gas turbine, in a relatively short time period. Moreover, there is a need for a tool that can effectively engage and manipulate those crossover tubes that are particularly difficult to handle.

SUMMARY OF THE PRESENT INVENTION

The present invention provides a unique, new and useful structure and method that addresses the foregoing issues. The structure and method are designed to enable an operator to effectively and efficiently engage and manipulate a crossover tube of a gas turbine.

Moreover, a preferred tool according to the present invention is designed to efficiently and securely engage and manipulate a crossover tube, including those crossover tubes that are particularly difficult to reach in a gas turbine.

In handling a crossover tube of a gas turbine, according to the present invention, a tool is manipulated to a gripping position in which it securely engages a portion of a crossover tube while applying a reaction force to a portion of the burner basket that is associated with the crossover tube, so that manipulating the handle manipulates the crossover tube that is engaged by the tool.

According to a preferred embodiment, designed specifically for use with a type 501 B & D frame Westinghouse gas turbine, the tool is manipulated to a gripping position in which it securely engages the spring loaded locks of a crossover tube while applying a reaction force to a portion of a flange of the burner basket that is associated with the crossover tube.

In this application, the concept of a tool that "securely engages" a crossover tube or a tool that is "securely engaged" with a crossover tube means that when the tool is engaged with the crossover tube, it cannot be disengaged from the crossover tube by the act of manipulating the tool to manipulate the crossover tube. According to a preferred embodiment, the tool has a gripper structure with a plurality of cups that are fitted over spring loaded locking bolts of a crossover tube, and the gripper structure and a follower moved to an engaged position in which the cups cannot be disengaged from the spring loaded locking bolts by the act of manipulating the handle to manipulate the crossover tube.

A tool according to a preferred embodiment is also unique in that it is specifically designed to reach, engage and manipulate the crossover tubes that are generally most difficult to reach. The tool can also be used to manipulate other crossover tubes, but another embodiment is also disclosed that employs certain basic principles of the present invention, but can be used to handle the crossover tubes other that the crossover tubes that are most difficult to reach.

Additional features of the present invention will become further apparent from the following detailed description and the accompanying drawings.

BRIEF DESCRIPTION OF THE DRAWINGS AND EXHIBITS

FIG. 3 is a schematic, three dimensional view of a handle and barrel for the tool of FIGS. 1 and 2;

FIGS. 3c and 3d are front and side views of the Teflon bushing for the tool;

FIGS. 3g and 3h are side and front views of the barrel linkage tabs for the tool;

FIG. 4a is a three dimensional view of the shaft and supporting member for the tool;

FIG. 4b is a side view of the shaft of FIG. 4a;

FIGS. 5a, 5b, 5c, 5d are front, side, back and top views of the support member of FIG. 4a;

FIGS. 5e and 5f are side and end views of a set screw for use with the support member of FIG. 4a;

FIGS. 6a and 6b are side and end views of adjusting jaws for the tool;

FIGS. 7a, 7b and 7c are top left and right side views of linkage for the tool;

FIGS. 8a and 8b are side and end views of the return spring for the tool;

FIGS. 9a and 9b are top and side views of the hinged ring for the tool, and FIG. 9c is a top view of part of the locking mechanism for the tool;

FIGS. 10a, 10b and 10c are side, top and bottom views of the types of cups carried by hinged ring;

FIGS. 15a and 15b are side and end views of a type of dowel pin for hinges in the tool;

FIGS. 16a and 16b are side and end views of a type of dowel pin for a spring in the tool;

FIGS. 17a and 17b are top and side views of a ring with roller bearings and posi-locks for the tool, and FIG. 17c is a top view of the posi-lock for the tool;

FIGS. 19a and 19b are side and front views of a spindle for a roller bearing of the tool;

FIGS. 20a and 20b are top and front views of a ring for the spindles and posi-locks of the follower for the tool;

FIGS. 21a and 21b are side and front views of a collar for a bearing of the tool;

FIGS. 22a and 22b are side and front views of a roller bearing for the tool;

DETAILED DESCRIPTION

As discussed above, the present invention provides a structure and method that is designed to enable an operator to effectively and efficiently engage and manipulate a crossover tube of a gas turbine. The principles of the invention are described below in connection with a tool for a 501 B & D Frame Westinghouse gas turbine, but from that description, the manner in which a tool can be designed and operated to handle crossover tubes from various types of gas turbines.

Figure 24:
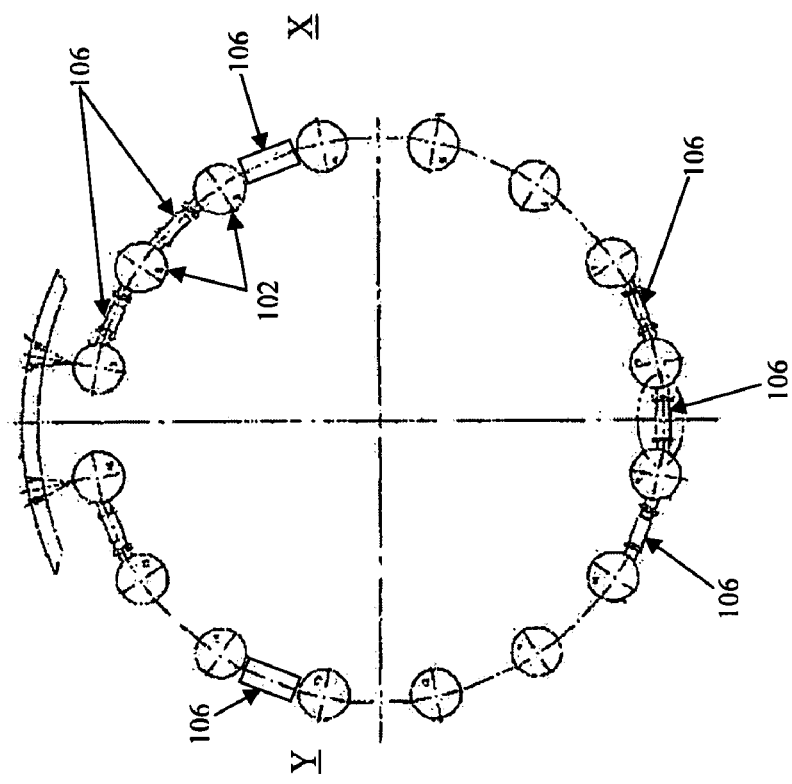
FIG. 24 is a schematic illustration of the locations of crossover tubes in a gas turbine.
Figure 23:
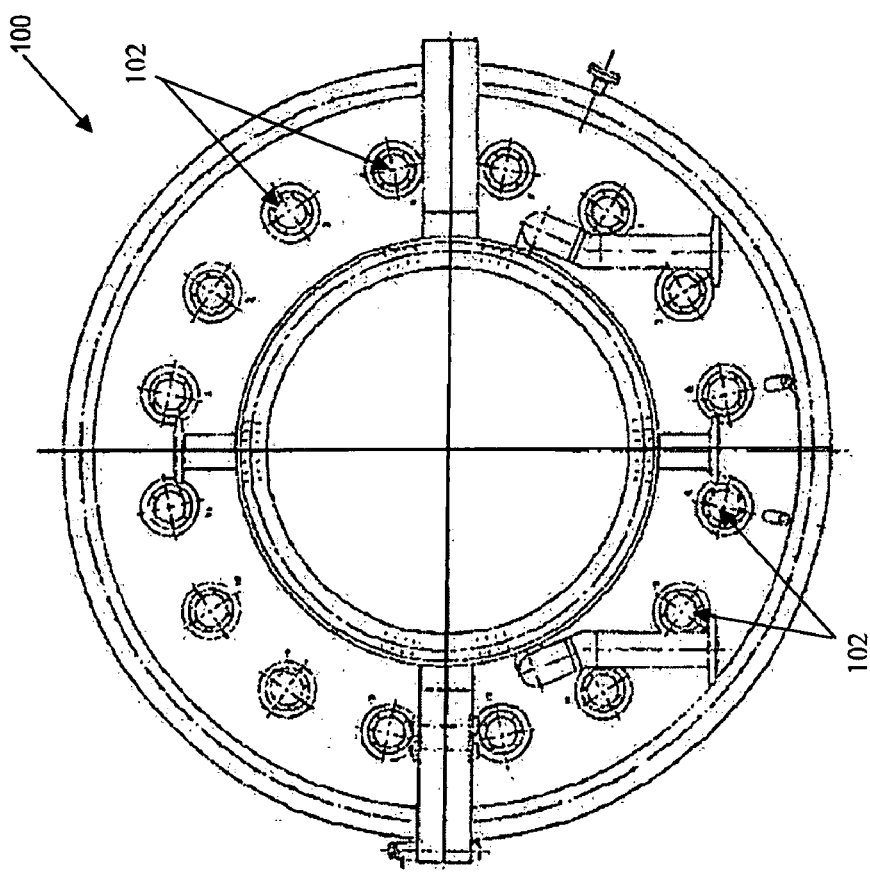
FIG. 23 is a schematic illustration of a gas turbine that would have crossover tubes of the type that can be manipulated by a tool according to the present invention.
Figure 25:
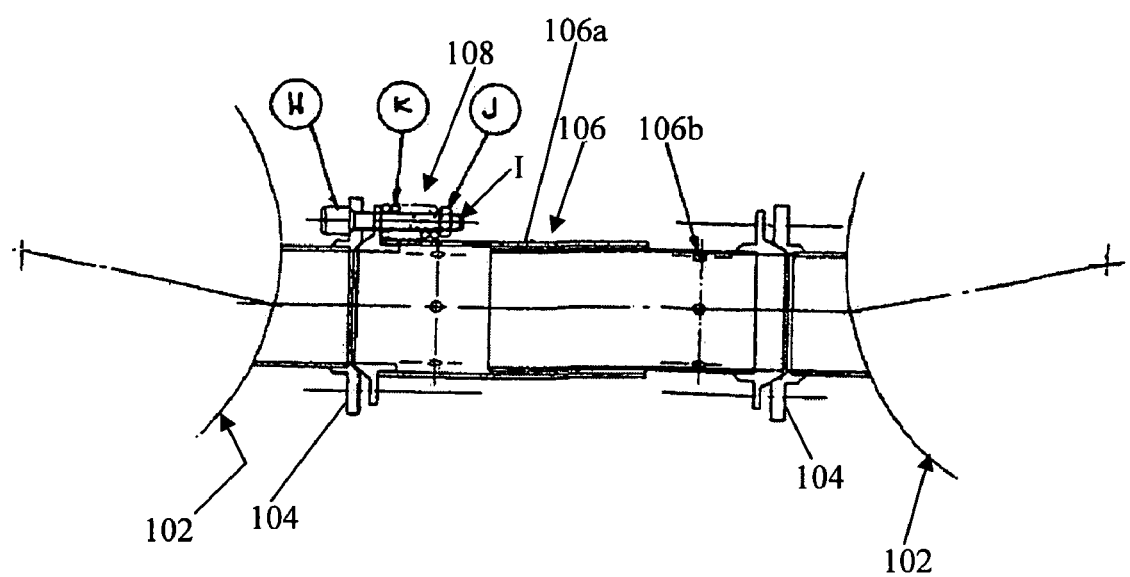
FIG. 25 is a schematic, enlarged illustration of a crossover tube of the type that can be manipulated by a tool according to the present invention.

FIGS. 23-25 illustrate a type of gas turbine 100 with which the principles of the present invention are particularly useful. The gas turbine 100 can be e.g. a 501 B & D Frame Westinghouse gas turbine of a type that is well known in the art. It includes an array of burner baskets 102 in which combustion takes place in the turbine. The burner baskets 102 have flanges 104 (FIG. 24), and crossover tubes 106 are connected to the burner baskets, and are effective to communicate flame between the burner baskets. The crossover tubes are generally formed in pairs, with one crossover tube 106a connected to one burner basket, and the other crossover tube 106b connected to an adjacent burner basket. The crossover tubes 106a and 106b interfit (e.g. with tube 106b disposed partially into tube 106a), as is well known to those in the art.

The crossover tubes 106 are secured to spring loaded locking bolts 108 on the burner baskets (as seen in FIG. 25 tube 106a is secured to spring loaded locking bots 108 of one burner basket, but as is well known to those in the art, the tube 106b would be similarly secured to spring loaded locking bots, not shown, of the adjacent burner basket). The spring loaded locking bolts (with locking heads H) are biased by springs K to unlocked positions, and are held in locking positions by manipulating the crossover tubes 106a, 106b to positions in which the springs are compressed to hold the crossover tubes in position on the burner baskets. In order to release a crossover tube, the tubes 106a, 106b must be manipulated (effectively turned about respective flanges 104 of the burner baskets) to a position in which the spring loaded locking bolts 108 are released to an unlocked position, and thereby enable the crossover tube 106 to the released. In order to secure a crossover tube to the burner basket, the crossover tube must be manipulated so that the spring loaded locking bolts 108 are compressed, to thereby lock the crossover tube in place in the turbine.

In the applicant's experience, there are about 4 crossover tubes that are particularly difficult to reach, in order to release those tubes. In the illustrated example, those crossover tubes are located e.g. at positions X and Y (each of which includes 2 tubes similar to 106a, 106b) (see FIG. 24). Specifically, a 501 B & D Westinghouse gas turbine generally has a manhole like cover that is removed in order to provide access to the burner baskets and crossover tubes. When the cover is removed, it is necessary for an operator to reach into the confines of the gas turbine with a tool, in order to remove least the crossover tubes at locations X and Y. Then, the operator can maneuver himself/herself through the opening and into the confines of the gas turbine, where it is a little easier for an operator to engage a crossover tube with a tool. Thus, the 4 crossover tubes located e.g. at positions X and Y that have to be removed by the operator with a tool, before the operator can maneuver into the confines of the gas turbine to remove the other crossover tubes, are particularly challenging. The preferred tool of the present invention is designed to securely engage and manipulate those crossover tubes, as well as other crossover tubes. In addition, an alternative tool according to the invention can be used to release the other crossover tubes, to efficiently remove those other crossover tubes.

Figure 1:
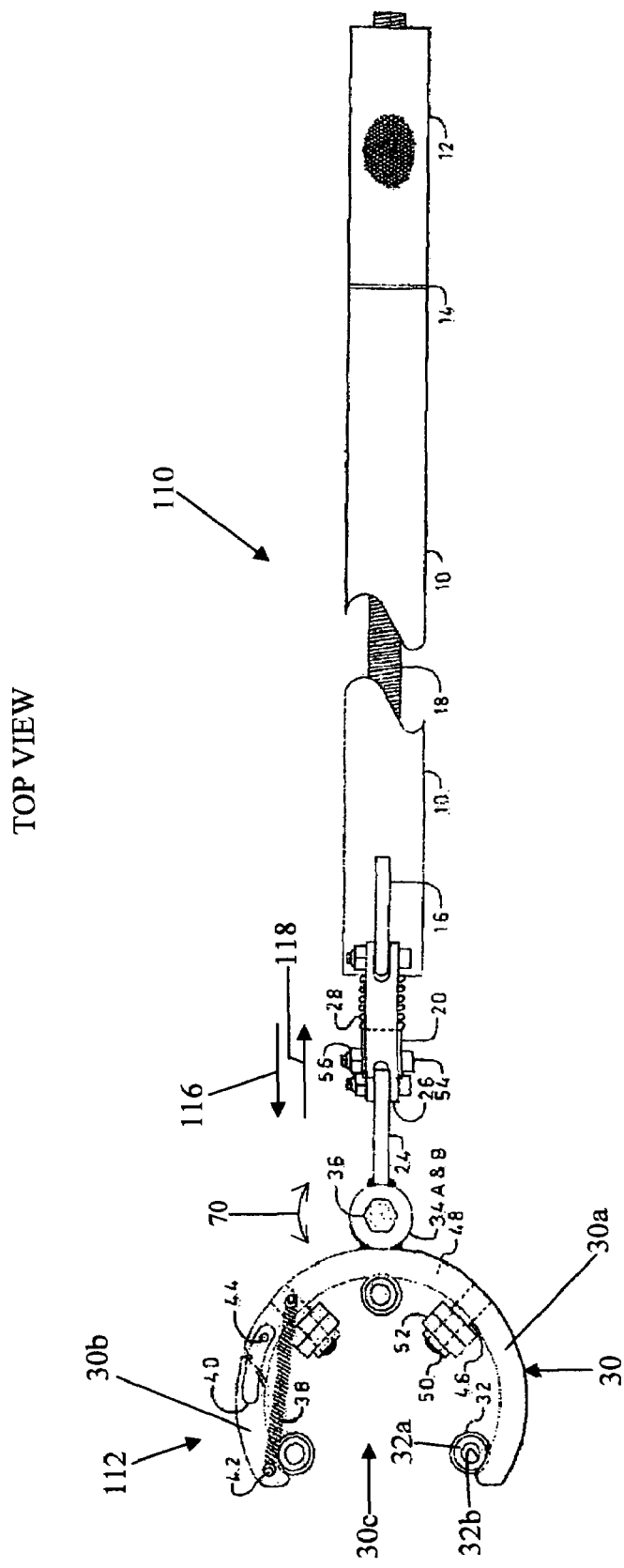
FIG. 1 is a schematic top view of a tool for manipulating a crossover tube of a gas turbine, according to the principles of the present invention.
Figure 2:
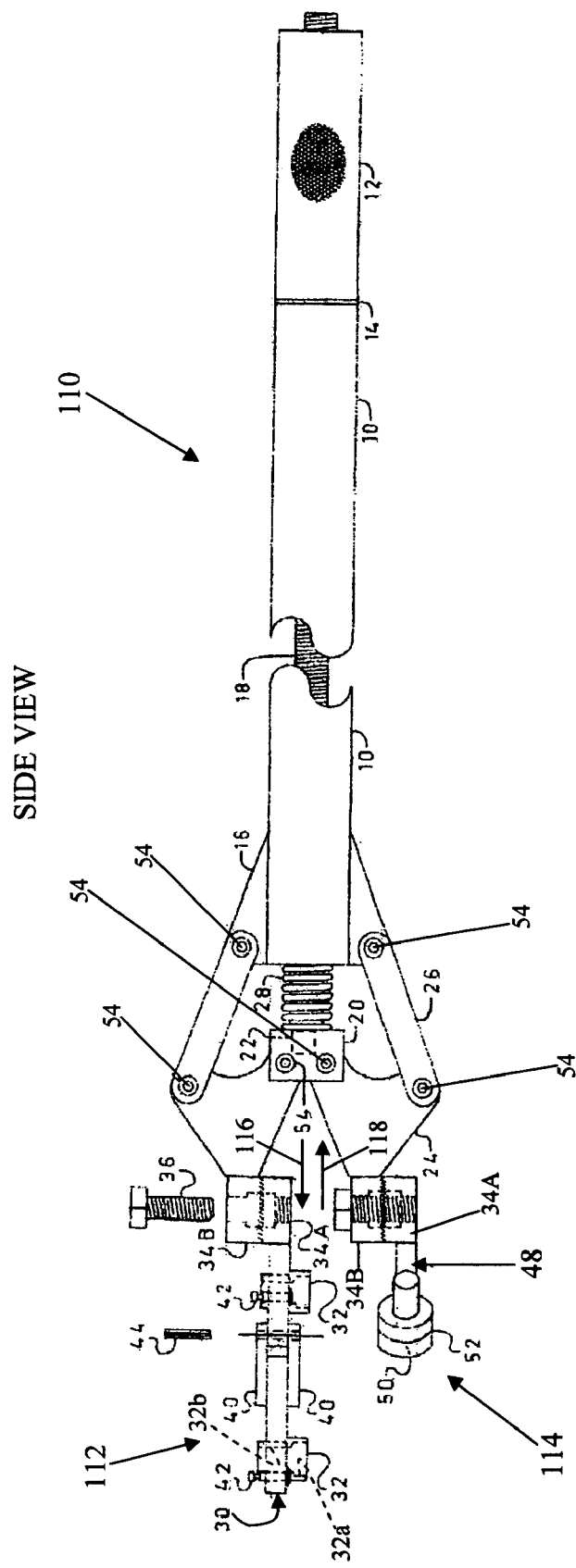
FIG. 2 is a schematic side view of the tool of FIG. 1.
Figure 3B:
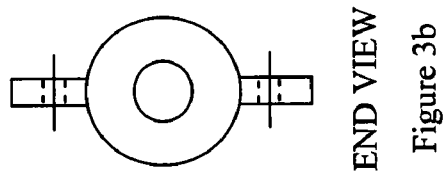
FIGS. 3a and 3b are side and end views of the barrel and linkage tabs for the tool of FIGS. 1 and 2.
Figure 3F:
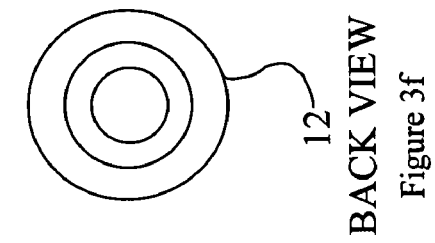
FIGS. 3e and 3f are side and rear views of the handle for the tool.
Figure 3A:
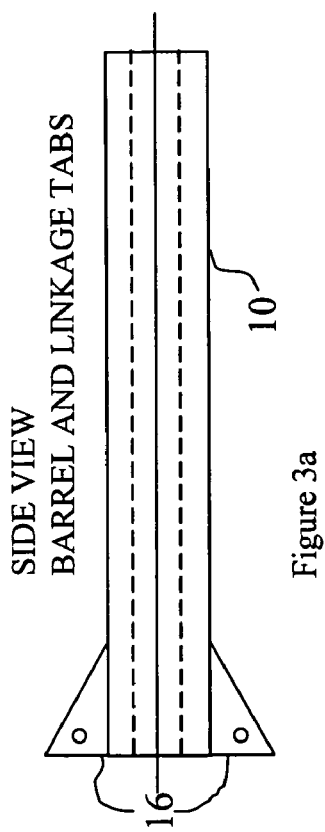
Figure 3E:
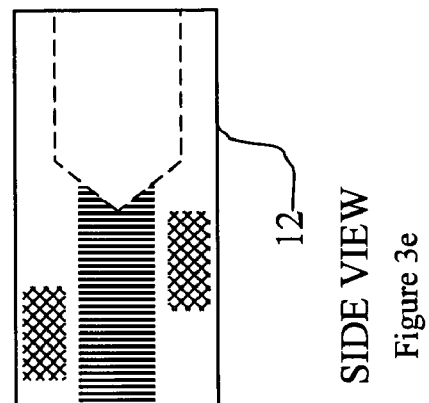
Figure 11B:
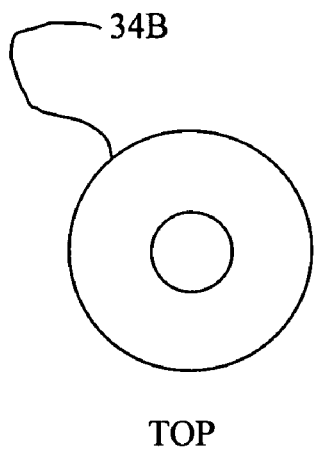
FIGS. 11a and 11b are side and top views of parts of a locking mechanism for the tool.
Figure 11A:
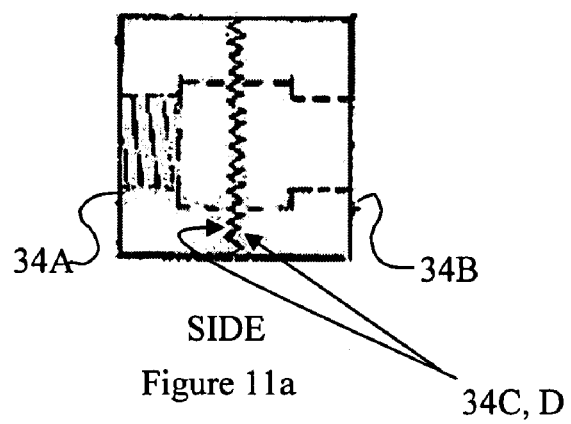
Figure 12A:
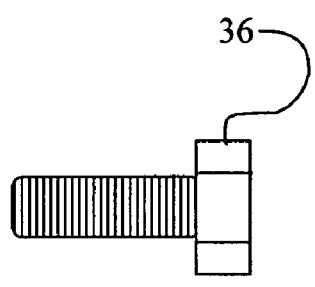
FIGS. 12a and 12b are side and end views of one of the bolts for use with one of the posi-locks of the tool.
Figure 12B:
Figures 13A, 13B:
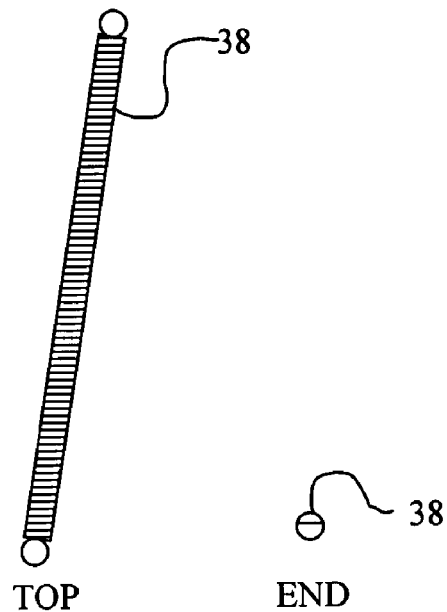
FIGS. 13a and 13b are top and end views of one form of spring used in the tool.
Figures 14A, 14B:
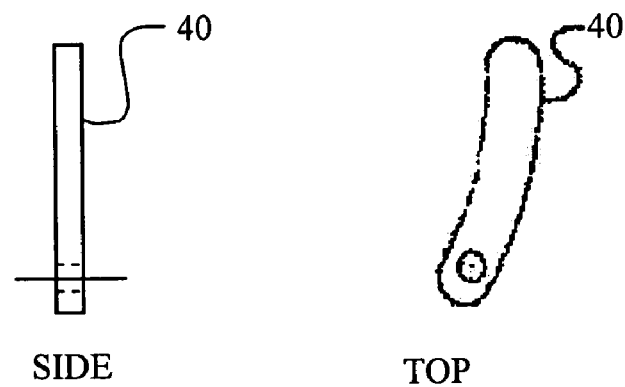
FIGS. 14a and 14b are side and top views of a type of hinge used in the tool.
Figures 18A, 18B:
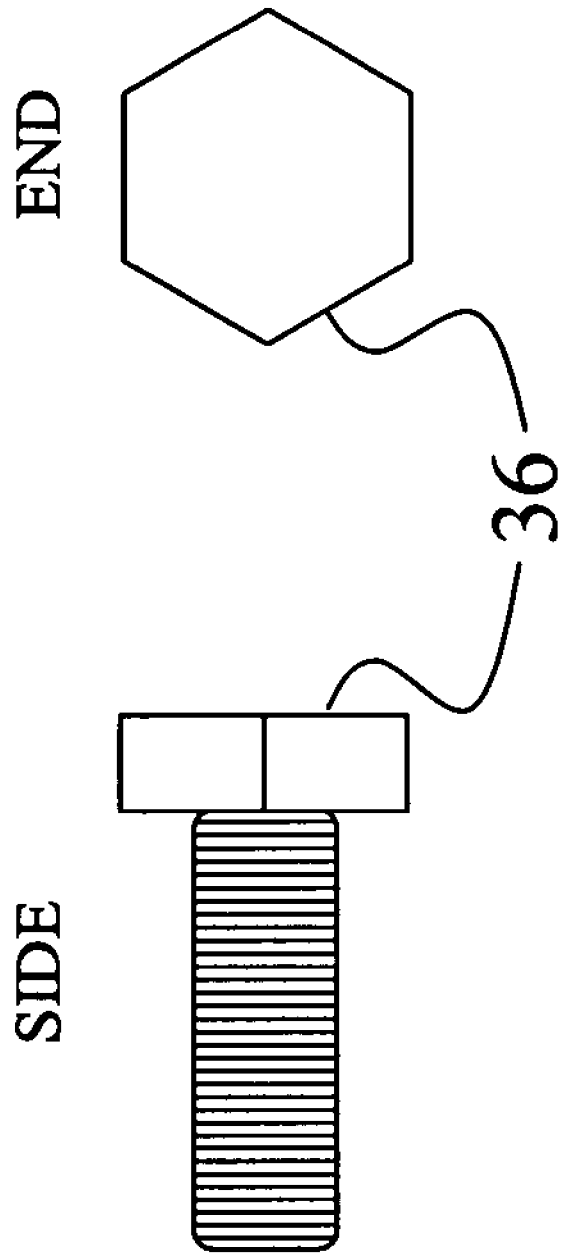
FIGS. 18a and 18b are side and end views of one of the bolts for use with the other of the posi-locks of the tool.

FIGS. 1 and 2 illustrate the overall configuration of a tool 110 according to the principles of the present invention. The tool comprises a handle 12, a gripper structure 112, and a follower structure 114. The handle operates the gripper and follower structures in a manner that enables the gripper structure to securely engage the spring loaded locking bolts of a crossover tube. When the gripper structure is securely engaging the spring loaded locking bolts of a crossover tube, the tool is manipulated to turn the crossover tube to a position where the spring loaded locking bolts are released, and the crossover tool can be effectively and efficiently manipulated to release it from the burner basket.

The gripper structure 112 comprises a plurality of cup shaped devices 32, each of which is configured to fit over and securely engage a spring loaded lock on a crossover tube when the gripper and follower structures are in an engaged position. Each cup shaped device 32 is configured with (i) a wide portion 32a configured to fit about a nut J or other fastener on a spring loaded lock of a crossover tube, and (ii)

a relatively narrower portion 32b configured to fit about a threaded shaft I of a spring loaded lock of a crossover tube.

The tool 110 includes a supporting member 20 coupled with the handle 12 and also coupled with the gripper and follower structures. The supporting member 20 is moveable in opposite first and second directions relative to the handle (i.e. in the directions shown by arrows 116, 118 in FIGS. 1 and 2). The coupling between the gripper and follower structures and the supporting member 20 is configured to move the gripper and follower structures toward an engaged position when the supporting member moves in the first direction 116 and to move the gripper and follower structures to a disengaged position when the supporting member moves in the second direction 118.

The supporting member 20 is coupled with the gripper and follower structures in a manner that causes the gripper and follower structures to move toward each other as the supporting member moves in the first direction 116, and away from each other as the supporting member moves in the second direction 118. Thus, the gripper and follower structures move toward each other (in a vertical sense in FIG. 2) as they move toward an engaged position, and away from each other (also in the vertical sense in FIG. 2) as they move toward a disengaged position.

The gripper structure 112 that engages the spring loaded locks is configured to provide a range of self adjustment over which the gripper structure can adjust itself to the position of the spring loaded locks and securely engage the spring loaded locks. Specifically, the gripper structure 112 includes a ring 30 to which the cup shaped devices 32 are fixed (e.g. welded), and the ring includes a main section 30a and a section 30b that is hinged to the main section. A spring 38 biases the ring sections 30a, 30b to the relationship shown in FIGS. 1, 9a, where the ring has a mouth 30c that enables the ring to fit about a crossover tube. The hinged sections 30a, 30b, and the spring 38 enable the ring sections 30a, 30b to pivot relative to each other over a predetermined range, so that the mouth 30c can widen to enable the ring to fit about a crossover tube.

The tool 110 includes a shaft member 18 that extends between the handle 12 and the supporting member 20. The shaft member 18 is preferably threaded over its length, and fits into threaded openings in the handle 12 and the supporting member 20, so that turning the handle 12 in one direction moves the supporting member 20 in the first direction 116 and turning the handle 12 in an opposite direction moves the supporting member 20 in the second direction 118. The shaft member 118 can have relatively coarse or relative fine threads, depending on how fine a level of adjustment is required for the tool.

A sleeve 10 (also referred to as a barrel) surrounds the shaft 18 and extends a major part of the distance between the handle 12 and the supporting member 20. Linkage that extends between the sleeve 10, the gripper structure 112 and the follower structure 114 is configured to control movement of the gripper and follower structures as the supporting member 20 is moved in the first and second directions. Specifically, linkage tabs 16 are fixed to the sleeve 10 (they are preferably welded to the sleeve). Linkages 26 are hinged to the linkage tabs 16 and to adjusting jaws 24, and the adjusting jaws 24 are also hinged to the supporting member 20. Thus, the adjusting jaws 24 can pivot relative to the linkage tabs and the supporting member, as the supporting member 20 moves in the first and second directions 116, 118. The adjusting jaws 24 are connected to the gripper and follower structures through posi-lock connections 34A, B, described more fully below, that enable the angular positions of the gripper and follower structures to be selectively adjusted, and secured (locked) in their adjusted positions.

As described above, the gripper structure includes the ring 30 with the hinged portions 30a, 30b. The follower structure 114 also includes a ring 48 that supports spindles 46 with roller bearings 52. The rings 30 and 48 of the gripper and follower are connected to the adjusting jaws 24 through the posi-locks 34A, B. The posi-locks include sections 34A, 34B that can rotate relative to each other, locking teeth 34C, 34D between the sections that help couple the sections in an adjusted position, and locking ⅜" bolts 36 that can be tightened to lock the posi-lock sections 34A, 34B in an adjusted position, and loosened to enable the posi-lock sections 34A, 34B to be adjusted relative to each other. This enables the angular positions of the rings 30, 48 to be selectively adjusted in angular directions shown by arrows 70 in FIG. 1.

The following additional features of the tool should also be noted. There are two dowel pins 42 for coupling the spring 38 to the ring sections 30a and 30b, and there is one dowel pin 44 for pivotally coupling the hinges 40 to the ring section 30a. There is a return spring 28 disposed about the shaft and acting between the sleeve 10 and the supporting member 20. When the supporting member 20 is moved in the first direction 116 the return spring 28 is compressed, and when the supporting member 20 is moved in the second direction 118, the return spring relaxes somewhat. A set screw 22 couples the shaft 18 to the supporting member 20. One or more allen bolts 54 (with locking nuts 56) couple the adjusting jaws 24 to the supporting member 20. A bushing 14, formed e.g. of Teflon, is disposed between the handle 12 and the sleeve 10, and enables the handle to turn easily relative to the sleeve 10 when it is desired to move the supporting member in the first or second directions.

In addition, it should be noted that the following materials are preferred for the components of the tool: The sleeve (barrel), linkage tabs, handle and linkages are preferably formed of Aluminum B221. The threaded shaft 18 is preferably made of hardened steel. The supporting member 20 is formed of hardened key stock steel. The set screw for the supporting member is hardened steel. The posi-locks and cup shaped devices 32 are cold roll steel. The dowel pins are formed of hardened steel. The rings 30 and 48 are formed of A-36 steel. The spindles for the roller bearings are formed of cold roll steel. The ⅜ in×1" bolts 36 are made of grade 8 steel and the allen bolts are hardened bolts. Also, the tool is preferably painted with a metallic base titanium paint.

In removing a crossover tube of a gas turbine with the tool 110, the tool is manipulated to a gripping position in which it securely engages the spring loaded locks of a crossover tube while applying a reaction force to a portion of the burner basket that is associated with the crossover tube. Specifically, the tool 110 is maneuvered into the confines of a gas turbine, toward the crossover tube. The handle 12 is turned in one direction, to move the supporting member 20 in the first direction 116, to couple the cup shaped devices 32 to the spring loaded locking bolts 108, and to cause the roller bearings 52 to enable and apply a reaction force to the flange 104 of the burner basket associated with the crossover tube. The pivotal, spring biased ring part 30b can provide a range of self adjustment, to allow the gripper structure to fit over the crossover tube with the cup shaped devices 32 fit over the spring loaded locking bolts. With the cup shaped devices 32 over the spring loaded locking bolts, and the handle 12 turned to continue to move the support member 20 in the first direction 116, the gripper and follower structures move toward each other, so that the roller bearings apply a reaction force to the flange of the burner basket as the cup shaped devices 32 fit snugly over the nuts J and threaded shafts I of the spring loaded locking bolts. This causes the gripper structure to securely engage the spring loaded locking bolts. In that condition, the entire tool can be manipulated, to turn the crossover tube to a position in which the spring loaded locking bolts 108 are released from locking engagement with the burner basket, and that allows the crossover tube to be easily manipulated to release it from the burner basket. As the tool is engaging the spring loaded locking bolts, and is being manipulated, the roller bearings 52, in addition to maintaining the reaction force, ride along flange 104 of the burner basket, to facilitate movement of the tool and the crossover tube.

It should also be noted that if it is desirable to adjust the angular position of the ring 30, to facilitate its engagement with the crossover tube, the posi-locks can be adjusted, prior to insertion of the tool into the confines of the gas turbine, to position the ring in a desirable orientation to engage the crossover tube.

In order to insert a crossover tube into the gas turbine, the crossover tube is positioned so that the spring loaded locking bolts of the crossover tube are located in recesses in the flange of a burner basket, and the tool is maneuvered so that the cup shaped devices 32 securely engage the spring loaded locking bolts. The handle 12 is turned to move the supporting member in the first direction 116, to bring the roller bearings 52 in contact with the burner basket flange 104 and to cause the gripper structure to securely engage the crossover tube. The tool is then manipulated to manipulate the crossover tube in the turbine, to lock the crossover tube in place on the burner basket. Then, the handle is turned in the opposite direction, to move the supporting member 20 in the second direction 118. This moves the gripper and follower structures to a disengaged position, to release the tool from the crossover tube.

The tool shown in the figures, and the method of operation described above, is particularly useful in connection with those crossover tubes that are particularly difficult to reach, and need to be initially handling when it is desired to release the crossover tubes from the gas turbine. Once those difficult crossover tubes have been released, a tool that is a slightly modified version of the tool described above can be used to quickly and efficiently remove the remaining crossover tubes from the gas turbine. It includes a gripper structure and follower structure that securely engages the spring loaded locking bolts by means of a plurality of cup shaped devices on the gripper structure and a follower with roller bearings that apply a reaction force to the burner basket. The gripper structure and follower structure are essentially the same as in the tool illustrated in the figures. The difference is that rather that a handle that is turned to manipulate linkage that manipulates the gripper and follower structures, the tool has gripper and follower structure that are coupled to a pair of pivotally supported, spring biased handle parts, that can be squeezed together (in the way a pair of pliers can be squeezed) to move the gripper and follower to an engaged position, and released so that they can return (under a spring bias) to a disengaged position. When in an engaged position, the gripper and follower structures are moved into secure engagement with the spring loaded locks in a manner similar to that described in connection with the tool illustrated in the Figures. The tool can then be manipulated to manipulate the crossover tube, and can be disengaged from the spring loaded locking bolts by releasing the handle parts, to enable the alternative tool to be disengaged from the spring loaded locking bolts.

The tools and described above provide a particularly effective combination for handling crossover tubes of a gas turbine. The tool shown in the figures can be used to release those crossover tubes that are particularly difficult to reach with a tool, and the alternative tool described above can then be used to quickly and efficiently remove the remaining crossover tubes. However, the tube of the figures can also be used to remove all of the crossover tubes, if desired.

Thus, the foregoing description provides a tool that is particularly efficient and effective at manipulating crossover tubes of a gas turbine. With the foregoing disclosure in mind, the manner in which the principles of the present invention can be used to provide a tool and a method for handling crossover tubes of various types of gas turbines will be apparent to those in the art.

What is claimed is:

1. A method of handling a crossover tube of a gas turbine, comprising the steps of
   a. providing a tool configured to be manipulated between gripping and release positions, and
   b. manipulating the tool to a gripping position in which it securely engages a portion of a crossover tube while applying a reaction force to a portion of a burner basket that is associated with the crossover tube, so that manipulating the handle manipulates the crossover tube that is engaged by the tool.

2. A method according to claim 1, wherein the step of manipulating the tool to a gripping position comprises engaging a follower with a portion of a burner basket that is associated with the crossover tube when the tool is in a gripping position, in a manner such that the follower provides bearing support that enables the follower to ride against the portion of the burner basket, as the crossover tube is being manipulated by the tool.

3. A method according to claim 2, wherein the tool includes gripper structure and the step of manipulating the tool to a gripping position comprises selectively moving a supporting member in a first direction relative to a crossover tube, and moving the gripper structure into engagement with spring loaded locks of a crossover tube and the follower into engagement with the portion of the burner basket as the supporting member is moved in the first direction relative to the crossover tube.

4. A method according to claim 3, wherein the gripper structure comprises a plurality of caps, each configured to fit securely over a respective spring loaded lock of a crossover tube.

5. A method according to claim 1, wherein the step of gripping the portion of the crossover tube comprises gripping spring loaded locks of the crossover tube.

6. A method according to claim 5, wherein the step of gripping the spring loaded locks comprises providing a range of self adjustment in which the gripper structure can adjust to the position of the spring loaded locks and securely engage the spring loaded locks.

* * * * *